J. M. WARDLAW.
COTTON CHOPPER.
APPLICATION FILED MAR. 7, 1921.
1,405,367. Patented Jan. 31, 1922.
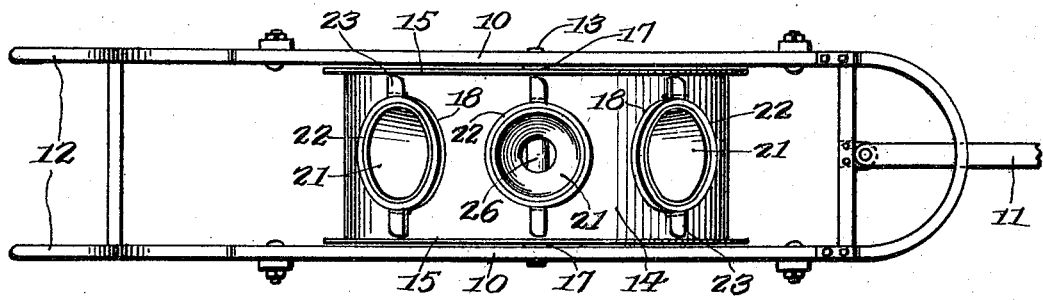
Fig. 1.
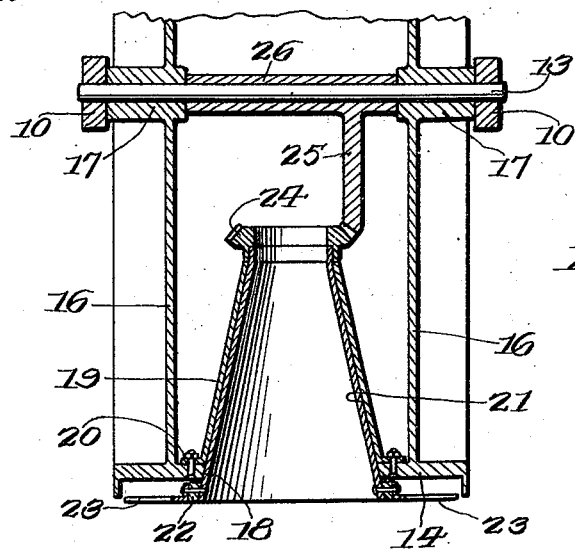
Fig. 2.
Fig. 3.
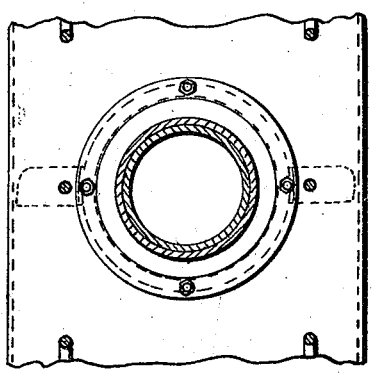
Inventor
Joseph M. Wardlaw
Witness
James F. FitzGibbon
By 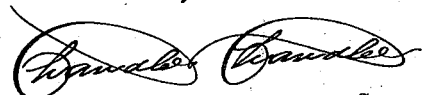
Attorneys

UNITED STATES PATENT OFFICE.

JOSEPH M. WARDLAW, OF BELTON, SOUTH CAROLINA.

COTTON CHOPPER.

1,405,367.  Specification of Letters Patent.  Patented Jan. 31, 1922.

Application filed March 7, 1921. Serial No. 450,174.

*To all whom it may concern:*

Be it known that I, JOSEPH M. WARDLAW, a citizen of the United States, residing at Belton, in the county of Anderson, State of South Carolina, have invented certain new and useful Improvements in Cotton Choppers; and I do hereby declare the following to be a full, clear, and exact description of the invention, such as will enable others skilled in the art to which it appertains to make and use the same.

This invention relates to cotton choppers and it has for its object to provide an improved structure in which the plants that are to remain standing, are completely enclosed while the intervening plants are chopped out so that the plants to remain are positively protected against injury and the plants to be removed are thoroughly chopped out.

It is a further object of the invention to provide such a form and arrangement of parts as will permit of economy of manufacture, that will give durability and will insure ease of operation.

Other objects and advantages will be apparent from the following description when taken in connection with the accompanying drawings.

In the drawings:

Figure 1 is a top plan view of a cotton chopper embodying the present invention.

Figure 2 is a vertical section through the cotton chopper in a plane including the axis of the chopper drum and a pair of choppers.

Figure 3 is a vertical section taken through the chopper drum midway of its ends and at right angles to its axis.

Referring now to the drawings, the present implement comprises a U-shaped frame and is provided at the bite of the U with a draft appliance 11 and having at the free ends of the sides of the frame the upwardly and rearwardly divergent handles 12. Connecting the sides 10 of the frame and fixed thereto is an axle 13.

Upon the axle 13 is rotatably mounted the chopper drum that consists of a cylindrical shell 14 having marginal radiating flanges 15 and having also the spokes 16 that connect with the hub discs 17 that turn on the shaft 13 and are spaced apart.

In the shell 14 are formed equally spaced openings 18 and against the inner surface of the shell and registering with each of these openings 18, is secured a sleeve 19 through the medium of a circumscribing flange 20 at its outer end that is riveted or bolted to the shell. These sleeves 19 have their axes in a common plane at right angle to the axis of the shell, the sleeves being radial to the shell and terminating at their inner ends approximately half way between the shell and its axis.

Within each bearing sleeve 19 is disposed a hollow cylindrical shaft 21 that is rotatable in the sleeve and at its outer end, beyond the shell 14, is provided with a hollow head 22 that circumscribes the shaft without closing its outer end. Secured at diametrically opposite points of the head 22 are chopping hoes 23 that radiate from it and which rotate with it, the hoes having such radiating extent that the orbits of the hoes of successive shafts 21, are in close relation for a purpose which will be presently presented.

In order to rotate the shafts 21 each are provided with a beveled gear 24 at its inner end and upon the shaft 13 between the hub plates 17 is fixed beveled gear 25, the hub 26 of which serves to maintain the plates 17 in spaced relation. The gear 25 is a segmental gear and has such angular extent as to engage only such of the beveled gears 24 of the shafts 21 as may be in position to engage their respective hoes with the ground during chopping operation.

With this construction, it will be understood that the implement is drawn along the row to be chopped and that when a shaft 21 has about reached that position where its hoes will strike the ground when the shaft is rotated, the corresponding gear 24 engages the segmental gear 25 and the latter being stationary, the gear 24 is rotated, this operation being continued until the cylindrical shell has rolled sufficiently far to carry the gear 24 out of engagement with the gear 25, which is at the time when corresponding hoes have liberated from contact with the ground.

It will be understood that by reason of the fact that the orbits of the hoes have closely approached each other, the ground is very thoroughly worked from the head 22 of one shaft 21 to that of the next shaft. It will also be understood that that portion of the ground corresponding to the area of a hollow shaft, will not be worked and thus, after the implement has traversed a row there will be spaced patches of unworked ground that will represent the unmolested plants that are to remain.

As previously stated the shell 14 has end radiating flanges 15. These flanges serve to partially sustain the weight of the implement so that the chopping hoes may not be unduly opposed in their operation.

It will be noted that in the use of this implement, the plants that are permitted to stand, are absolutely protected against molestation by operation of the hoes, the shells and the bearing sleeves and the hollow shafts serving to prevent dirt and plants that are dropped out from being thrown onto or against the plants that are to remain.

What is claimed is:

1. A cotton chopper comprising a hollow open ended shaft having chopping hoes rotating therefrom, means for positioning the hollow shaft over a plant to stand and means for rotating the shaft and therewith its hoes to chop out other plants.

2. A cotton chopper comprising a rotatable carrier, a plurality of hollow shafts rotatably mounted in the carrier in position for successive placement about corresponding plants to stand, each of the shafts having chopping hoes disposed to chop out plants adjacent the plant to stand and means for rotating the shafts.

3. A cotton chopper comprising a rotatable shell having openings therein, a hollow open ended shaft rotatably mounted in each opening and having rotating hose at its outer end and means for rotating the shaft.

4. A cotton chopper comprising a frame, a cylindrical shell rotatably mounted in the frame and having openings therein, hollow open ended shafts rotatably mounted in the openings, chopping hoes rotating from each shaft exteriorly of the shell, a gear carried by each shaft within the shell and a segmental gear in fixed relation to the frame and disposed for engagement by the said shaft gear successively for rotation with them and then with their shaft and hoes.

5. A cotton chopper comprising a frame, a shell rotatably mounted in the frame and having openings therein, sleeves fixed radially of the shell and in registration with the openings respectively, hollow open ended shafts rotatably mounted within the sleeves and having chopping hoes exteriorly of the shell, gears carried by the inner end portions of the shafts and a segmental gear carried by the frame and fixed thereto and disposed in position with engagement by the shaft gears successively for rotating them.

In testimony whereof, I affix my signature, in the presence of two witnesses.

JOSEPH M. WARDLAW.

Witnesses:
J. R. C. GRIFFIN,
L. P. THOMPSON.